US012060741B2

(12) United States Patent
Lamoureux et al.

(10) Patent No.: US 12,060,741 B2
(45) Date of Patent: Aug. 13, 2024

(54) GLAZING UNIT WITH TWO-PART WINDOW BRACKET AND METHOD FOR PRODUCING SAID GLAZING UNIT

(71) Applicant: SAINT-GOBAIN GLASS FRANCE, Courbevoie (FR)

(72) Inventors: Laurent Lamoureux, Montmort-Lucy (FR); Xavier Drouet, Marly la Ville (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 220 days.

(21) Appl. No.: 17/610,930

(22) PCT Filed: May 7, 2020

(86) PCT No.: PCT/EP2020/062659
§ 371 (c)(1),
(2) Date: Nov. 12, 2021

(87) PCT Pub. No.: WO2020/229283
PCT Pub. Date: Nov. 19, 2020

(65) Prior Publication Data

US 2022/0220791 A1 Jul. 14, 2022

(30) Foreign Application Priority Data

May 13, 2019 (FR) ....................................... 1904937

(51) Int. Cl.
*E05F 11/38* (2006.01)
*E06B 3/54* (2006.01)

(52) U.S. Cl.
CPC .......... *E05F 11/385* (2013.01); *E06B 3/5436* (2013.01); *E05Y 2600/56* (2013.01); *E05Y 2600/626* (2013.01); *E05Y 2900/55* (2013.01)

(58) Field of Classification Search
CPC .. E05F 11/385; E06B 3/5436; E05Y 2600/56; E05Y 2600/626; E05Y 2600/526; E05Y 2900/55
(Continued)

(56) References Cited

U.S. PATENT DOCUMENTS 4,848,032 A * 7/1989 Ballor .................. E05F 11/385 49/350
5,537,783 A * 7/1996 Kazino ................ E05F 11/385 411/366.1
(Continued)

FOREIGN PATENT DOCUMENTS

DE 35 35 719 C1 9/1986
DE 19609252 C1 * 1/1997 ............. B21D 39/06
(Continued)

OTHER PUBLICATIONS

International Search Report as issued in International Patent Application No. PCT/EP2020/062659, dated Jul. 29, 2020.

*Primary Examiner* — Jerry E Redman
(74) *Attorney, Agent, or Firm* — Pillsbury Winthrop Shaw Pittman LLP

(57) ABSTRACT

A glazing unit for a vehicle which can be moved heightwise includes a window including at least one hole and at least one window bracket. The window bracket includes a flange including a plate positioned facing one face of the window, and a hollow tubular sleeve of which a wall extends into the hole in the window along a thickness, and a counter-flange including a counter-plate positioned facing another face of the window and a tubular counter-sleeve of which a wall extends along a thickness into the sleeve of the flange.

19 Claims, 4 Drawing Sheets

(58) Field of Classification Search
USPC ..................................................... 49/374, 375
See application file for complete search history.

(56) References Cited

U.S. PATENT DOCUMENTS

| | | | | |
|---|---|---|---|---|
| 5,599,148 | A * | 2/1997 | Hirose | F16B 37/0842 411/338 |
| 5,729,930 | A * | 3/1998 | Schust | B60J 1/17 49/375 |
| 5,966,872 | A * | 10/1999 | Wasek | E05F 11/385 49/374 |
| 6,152,636 | A * | 11/2000 | Nass | B60J 1/17 403/DIG. 8 |
| 6,453,617 | B1 * | 9/2002 | Klippert | E05F 11/385 49/375 |
| 7,584,573 | B2 * | 9/2009 | Yoshii | E05F 11/385 49/374 |
| 8,516,746 | B2 * | 8/2013 | Polimeni | E05F 11/385 49/352 |
| 8,904,711 | B2 * | 12/2014 | Lopez | B60J 1/007 49/374 |
| 8,943,750 | B2 * | 2/2015 | Twork, Jr. | E05F 11/385 49/352 |
| 11,168,501 | B2 * | 11/2021 | Pavlovic | E05F 11/382 |
| 2005/0072077 | A1 | 4/2005 | Yoshii et al. | |
| 2005/0144862 | A1 * | 7/2005 | Jackson, II | B32B 17/10293 52/204.5 |
| 2017/0241181 | A1 * | 8/2017 | Reinke | E05F 11/385 |
| 2022/0220791 | A1 * | 7/2022 | Lamoureux | E06B 3/5436 |

FOREIGN PATENT DOCUMENTS

| | | | | |
|---|---|---|---|---|
| DE | 10243496 | A1 * | 4/2004 | E05F 11/385 |
| DE | 102005008629 | A1 * | 9/2006 | E05F 11/385 |
| DE | 102017206018 | A1 * | 10/2018 | |
| EP | 708220 | A1 * | 4/1996 | B60J 1/17 |
| JP | H06-221052 | A | 8/1994 | |
| KR | 2005102171 | A * | 10/2005 | B60J 1/004 |
| WO | WO 2008/065310 | A1 | 6/2008 | |
| WO | WO-2020229283 | A1 * | 11/2020 | E05F 11/385 |

* cited by examiner

GLAZING UNIT WITH TWO-PART WINDOW BRACKET AND METHOD FOR PRODUCING SAID GLAZING UNIT

CROSS-REFERENCE TO RELATED APPLICATIONS

This application is the U.S. National Stage of PCT/EP2020/062659, filed May 7, 2020, which in turn claims priority to French patent application number 1904937 filed May 13, 2019. The content of these applications are incorporated herein by reference in their entireties.

FIELD

The invention relates to the field of glazing units comprising a window and at least one window bracket to allow said window to be moved in translation.

The invention does not relate to the field of glazing units in which the window can be moved by rotation.

BACKGROUND

The prior art knows a window bracket solution from international patent application No WO 2008/065310. In that document, the window bracket has an axis passing through the window via a hole, for the passage of a threaded attachment rod. This passageway is complicated because it is made up of two orifices of different sizes each made in one of the two glass sheets of the laminated window. A washer is positioned inside the larger orifice, then a nut is screwed onto the threaded attachment rod, from the side of the largest orifice.

This solution can be improved upon because, during use, the forces applied by the window bracket to the window are liable to damage the lamination. In addition, the compactness and the weight can be improved.

Furthermore, it may sometimes be difficult to manage with precision the position of the axis of the attachment rod; now, this position is essential for the precision of the movement applied to the glazing unit in order to move same.

The prior art also knows, from document US 2005/07077, a window bracket made in two parts joined together by a hinge. These two parts each comprise a tube portion and a pin, one tube portion being intended to be slid into the other and the final position attached by the collaboration of the pins. This window bracket is not reliable enough because when a fitter, particularly on a high-throughput assembly line, tightens the bolt a little too much, it causes the pins to disengage.

The prior art also knows, from document DE 3535719, a window bracket system with a plate and counter-washer having a spiral external surface and three pins, which needs to be screwed into a three-part partially tubular element connected to the plate. This system is intended to make it possible to compensate the tolerances but is not reliable enough because in the absence of a counter-plate, all the forces pass through the plate.

SUMMARY

The invention is described with reference to an application to glazing units for a vehicle comprising a window, notably a laminated window therefore comprising an exterior sheet of glass, an interior sheet of glass and an interlayer sheet of adhesive situated between said two sheets of glass, said window having an exterior face intended to face toward an exterior space, an edge face and an interior face intended to face toward an interior face.

The invention relates more particularly to a glazing unit comprising at least one window bracket having an axis passing through said window via a hole formed in the window and opening on both faces of the window.

The present invention intends to overcome the disadvantages of the prior art and is more specifically and preferentially directed at a glazing unit equipped with at least one window bracket that is very compact and very lightweight, the axis of which can be positioned with precision and which is fixed very securely to the window without the risk of transmitting damaging load to the window.

The present invention intends to constitute a solution for rapid, simple and effective attachment of a glazing unit to a system used for moving the glazing unit, while offering the possibility for the window bracket to be the same, whether or not the window of the glazing unit is laminated; thus, when one vehicle series specifies laminated windows for certain models of the series and monolithic windows for other models of the series, the same window bracket can be used for both series.

The present invention intends to form a particularly compact and reliable solution for a curved window.

To this end, one subject of the invention is a glazing unit for a vehicle that can be moved heightwise, according to claim 1. This glazing unit comprises on the one hand, a window, preferably laminated, said window having an exterior face intended to face toward an exterior space, an edge face and an interior face intended to face toward an interior space, said window comprising at least one open-ended tubular hole having a thickness, and, on the other hand, at least one window bracket having an axis passing through said window via said hole.

Said glazing unit is notable in that said window bracket comprises:

- a flange comprising, on the one hand, a plate positioned facing one face of said window, and preferably facing said interior face of said window, and, on the other hand, a tubular sleeve, of which a wall extends into the hole in said window along a sleeve thickness
- a counter-flange comprising, on the one hand, a counter-plate positioned facing another face of said window, and preferably facing said exterior face of said window, and, on the other hand, a tubular counter-sleeve of which a wall extends along a counter-sleeve thickness into the sleeve of said flange
- with said sleeve comprising, at an opposite end to said plate, at least one end stop to immobilize said counter-plate.

Said tubular hole in said window is open ended in the sense that it is open at one end on the exterior face of said window and at another end on the interior face of said window; it is of entirely circular cross section and lies some distance away from the edge face of said window, so is not a notch which would open onto the edge face of said window.

As a preference, said sleeve thickness is greater than said thickness of said window at the site of the hole; said sleeve having an axis coaxial with the axis of the hole in said window.

As a preference, said counter-sleeve thickness is greater than said thickness of said window at the site of the hole; said counter-sleeve having an axis coaxial with the axis of said window inside the tubular sleeve of said plate.

As a preference, said counter-sleeve thickness is greater than said sleeve thickness, so as to maximize the spreading of the forces of the counter-sleeve in the sleeve and thus improve the mechanical strength.

By nature, a tubular sleeve is hollow and a tubular counter-sleeve is hollow. The sleeve is completely tubular all along what is referred to as the "sleeve thickness" and thus in transverse section has the shape of a complete annulus all along this thickness. The counter-sleeve is completely tubular all along what is referred to as the "counter-sleeve thickness" and thus in transverse section has the shape of a complete annulus all along this thickness.

The internal surface of the sleeve is smooth and the external surface of the counter-sleeve is smooth; the counter-sleeve is not screwed into the sleeve but is slipped/slip into same.

The window bracket according to the invention has an axis passing through the window via said hole, for the passage of an attachment rod, for example threaded; it is this rod in particular that provides attachment for the window bracket, and thus for the glazing unit, to a glazing unit-moving system, so as to allow it to be moved with respect to a fixed part of the vehicle.

What is meant within the meaning of the present invention by "fastening" or "attachment" are mechanical attachments which can be attached and detached by hand or using a mechanical tool. That which is attached is thus in a fixed position; catching, screwing or clip-fastening are each forms of attachment. The axis of the window bracket mentioned hereinabove is thus an axis of attachment.

What is meant within the meaning of the present invention by "fixing" are chemical fixings which lead to molecular modifications that are irreversible unless the connection is broken making the window bracket unusable; bonding is a fixing.

Each of these two expressions excludes the other.

As a preference, in order to increase the reliability of the fixing, a layer of adhesive is situated in the hole, between said window and said sleeve. Said layer of adhesive is preferably also situated between at least one face and the plate and/or counter-plate, and more preferably still, the two faces of said window and the plate and counter-plate.

As a preference also, said layer of adhesive is inserted between the sleeve and the counter-sleeve, particularly at the site of the end stop or stops, in order to further improve the reliability of the fixing.

As a preference, to facilitate the immobilizing of the counter-plate, said flange comprises at least one, and preferably two, pin(s) which enters (enter) said counter-plate preferably with two pin(s) situated diametrically opposite one another about said axis. For better mechanical retention of the pins in the counter-plate, and a further preference, the two pins are situated directly opposite one another about the vertical.

As a preference, in order to improve the compactness of the window bracket, said or each pin consists of part of the wall of said sleeve which extends locally into said counter-plate, preferably along the entire thickness of said counter-plate, more preferably still without extending beyond said counter-plate.

As a preference, for attaching the window bracket, an attachment rod may be inserted into said counter-sleeve, this attachment rod preferably having a solid cylindrical cross section and more preferably still being threaded so that it can be screwed into said counter-sleeve. It also preferably comprises a head.

As a preference, to facilitate attachment of the window bracket to the system for moving the glazing unit, an intermediate support component is situated between a head of said rod and said plate; preferably on the inside. Said intermediate support component preferably has at least one finger extending against part of the edge face of said window, this finger also preferably extending against an opposite face of said window.

In order to achieve reliable bracing, a washer is preferably situated between a head of said attachment rod and said plate; preferably on the interior side.

As a preference, to increase the ease of manufacture, the tubular hole in the window is simple: it has the same diameter over its entire thickness and thus opens onto both of the two faces of the window with the same diameter; in the case of a laminated window, it is then a hole that has the same diameter in the sheets of glass and in the adhesive interlayer.

As a preference, the sleeve has an external diameter and an internal diameter which are both constant along the entire length of what is referred to as the "sleeve thickness"; these two diameters are preferably concentric. The counter-sleeve preferably has an external diameter and an internal diameter that are both constant along the entire length of what is referred to as the "counter-sleeve thickness"; these two diameters are preferably concentric.

As a preference, in order to increase the precision of the fixing, said counter-sleeve has an external diameter which is identical, to within 1.2 mm, to an internal diameter of said sleeve As a preference, in order to increase the compactness, said window bracket does not have any part extending under the edge face of the window; neither the flange nor the counter-flange comprises a part that extends below the edge face of the window.

As a preference, the window bracket comprises no nut in the form of an independent component, so as to increase compactness, facilitate mounting and reduce weight.

The glazing unit according to the invention preferably comprises two window brackets.

Another subject of the invention is a method for producing a glazing unit for a vehicle that can be moved heightwise according to the invention, said glazing unit comprising on the one hand, a window, preferably laminated, said window having an exterior face intended to face toward an exterior space, an edge face and an interior face intended to face toward an interior space, said window comprising at least one open-ended tubular hole having a thickness, and, on the other hand, at least one window bracket having an axis passing through said window via said hole.

Said method is notable in that the attaching of said window bracket to said window is performed by:

- positioning a flange comprising, on the one hand, a plate facing one face of said window, and preferably facing said interior face of said window, and, on the other hand, a tubular sleeve, of which a wall extends into the hole in said window along a sleeve thickness, then
- positioning a counter-flange comprising, on the one hand, a counter-plate facing one face of said window, and preferably facing said exterior face of said window, and, on the other hand, a tubular counter-sleeve of which a wall extends along a counter-sleeve thickness into the sleeve of said flange
- with said sleeve comprising, at an opposite end to said plate, at least one end stop to immobilize said counter-plate.

Advantageously, the present invention allows a window bracket to be fixed to a glazing unit in a reliable and compact manner. A solution for compact fixing and attachment makes it possible to reduce the height and/or the thickness of the window bracket, namely respectively along the vertical axis Z of the vehicle and along the lateral axis Y of the vehicle in the case of a side glazing unit; that then makes it possible to reduce the space needed inside the door and thus increase the volume available in the vehicle interior. That further makes it possible to lighten the glazing unit. Furthermore, the invention makes it possible to reduce the distance between the axis of attachment of the window bracket and a wiping seal situated above it for the same height of window.

The absence of a nut makes mounting easier and prevents the time lost if the nut is dropped before being screwed on.

The plate and the counter-plate allow good distribution of forces on each side of the window. The window is not stressed by the window bracket; when the window is laminated, there is therefore no risk of damaging the lamination.

BRIEF DESCRIPTION OF THE DRAWINGS

The following figures nonlimitingly illustrate the invention.

DETAILED DESCRIPTION

Figure 1:
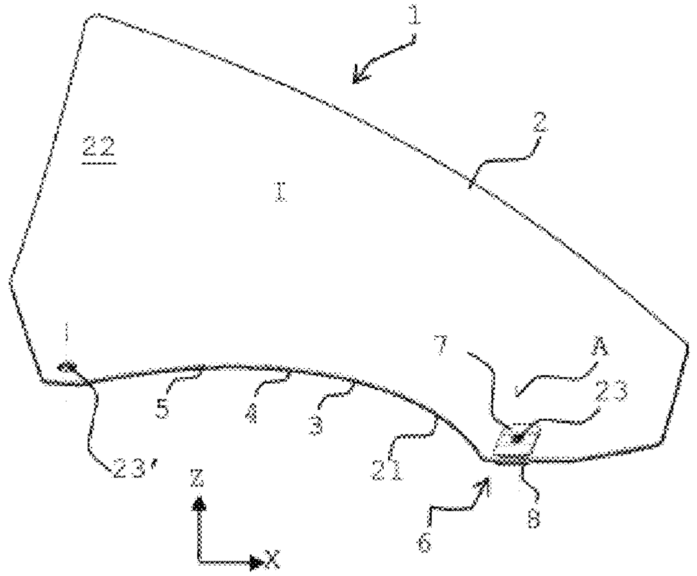
FIG. 1 illustrates a perspective view, from the inside, of a glazing unit comprising two holes, one of which is fitted with a window bracket according to the invention.
Figure 2:
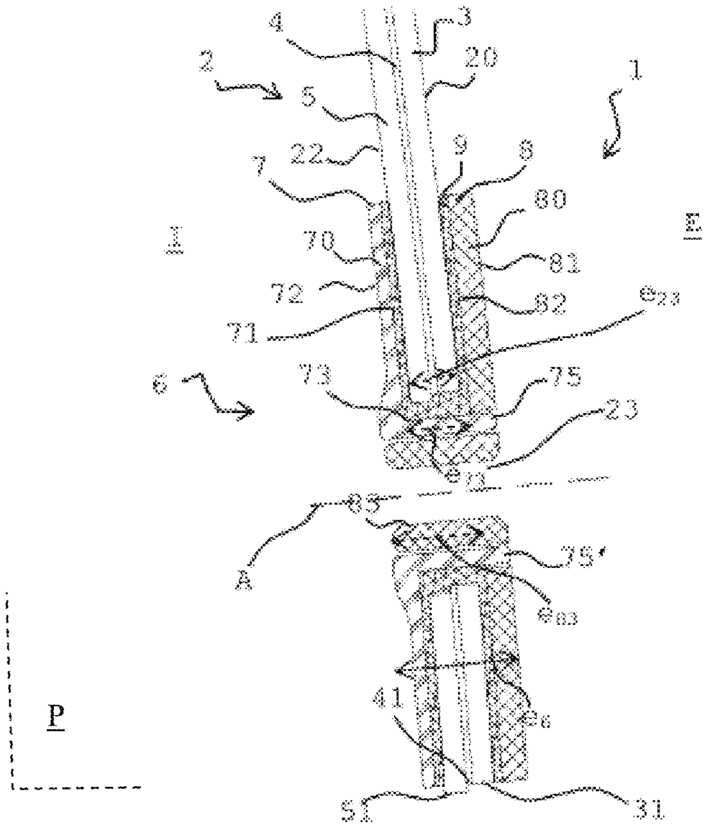
FIG. 2 illustrates a partial view in vertical cross section in plane P of FIG. 4 at the site of the hole in the glazing unit of FIG. 1 which is fitted with the window bracket.
Figure 3:
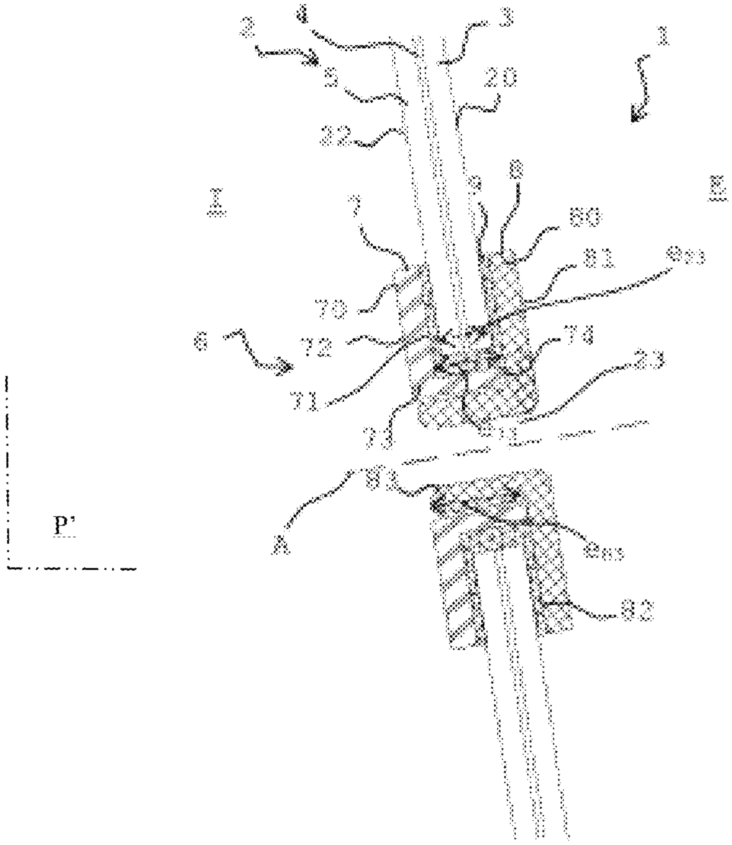
FIG. 3 illustrates a partial view in horizontal cross section in plane P' of FIG. 4 at the site of the hole in the glazing unit of FIG. 1 which is fitted with the window bracket.
Figure 4:
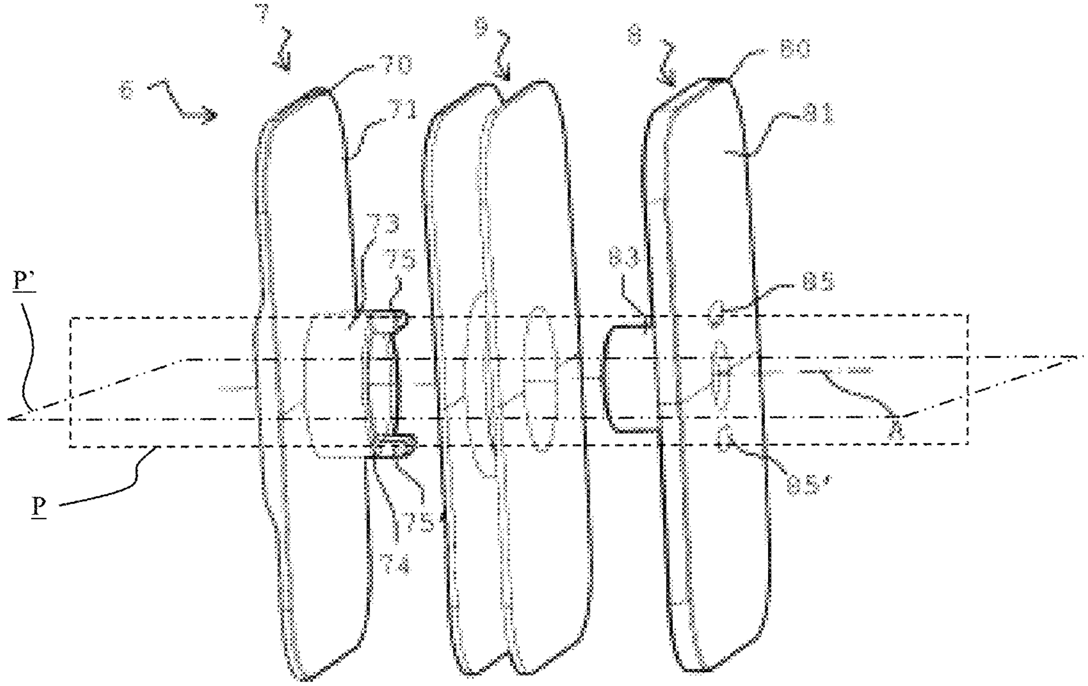
FIG. 4 illustrates an exploded perspective view of the window bracket used in FIG. 1.
Figure 5:
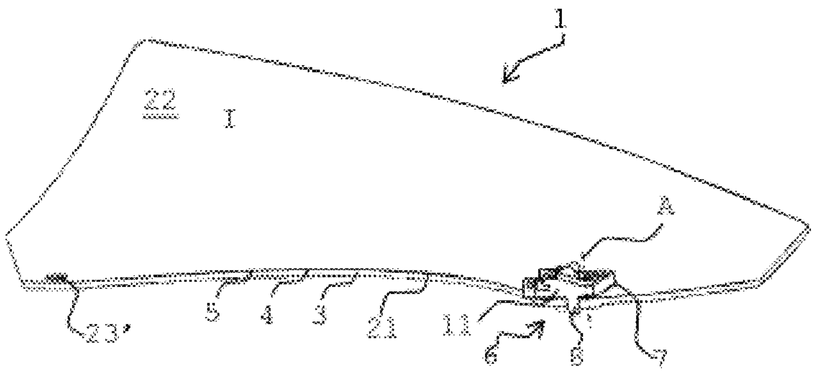
FIG. 5 illustrates a perspective view of the glazing unit of FIG. 1 in an installation situation.
Figure 6:
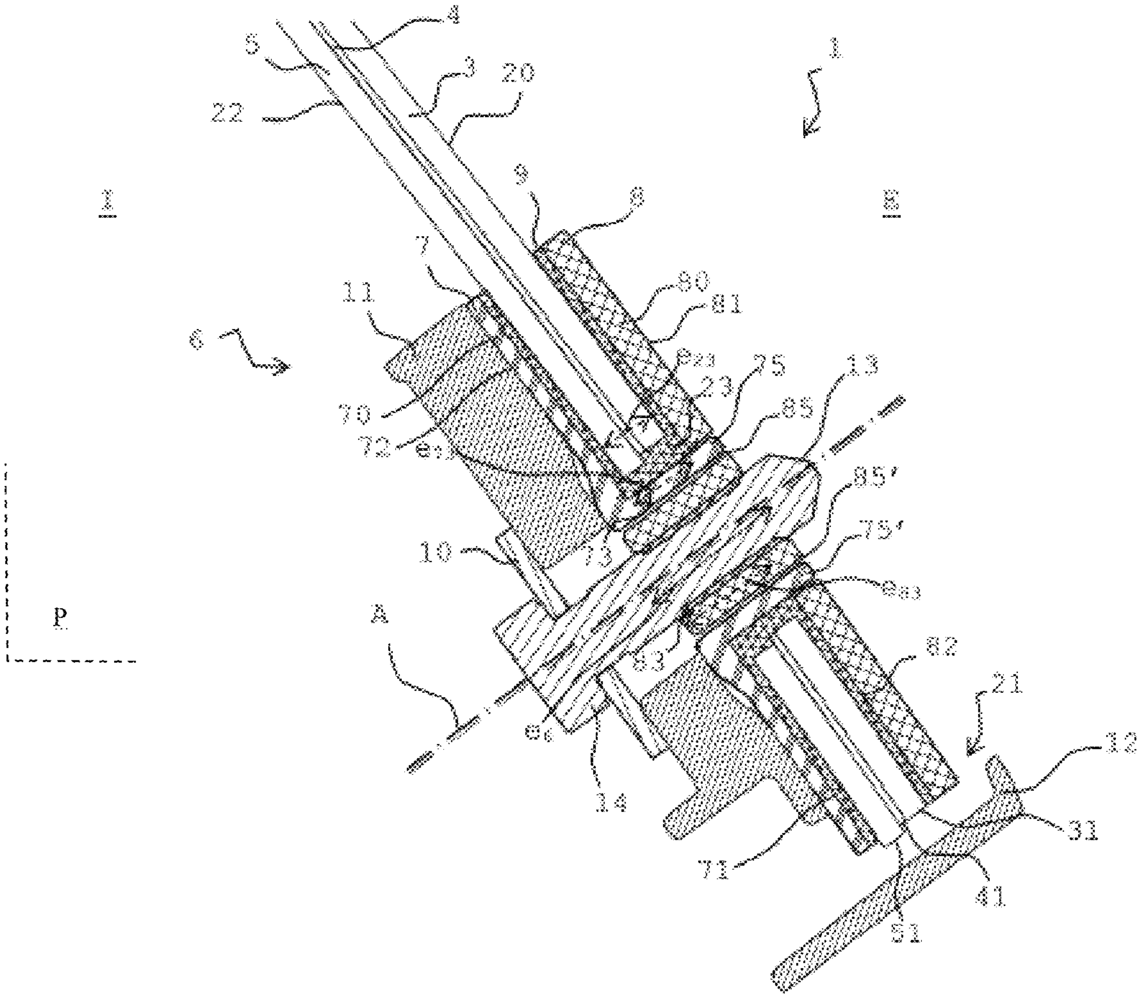
FIG. 6 illustrates a partial view in vertical cross section in plane P of FIG. 8 at the site of the hole of the glazing unit of FIG. 5 which is fitted with the window bracket.
Figure 7:
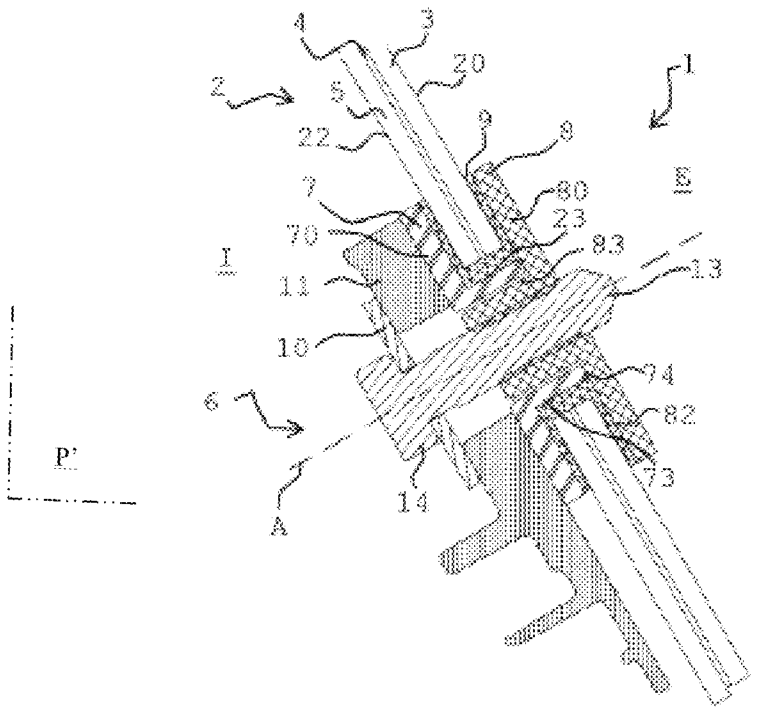
FIG. 7 illustrates a partial view in horizontal cross section in plane P' of FIG. 8 at the site of the hole in the glazing unit of FIG. 5 which is fitted with the window bracket.
Figure 8:
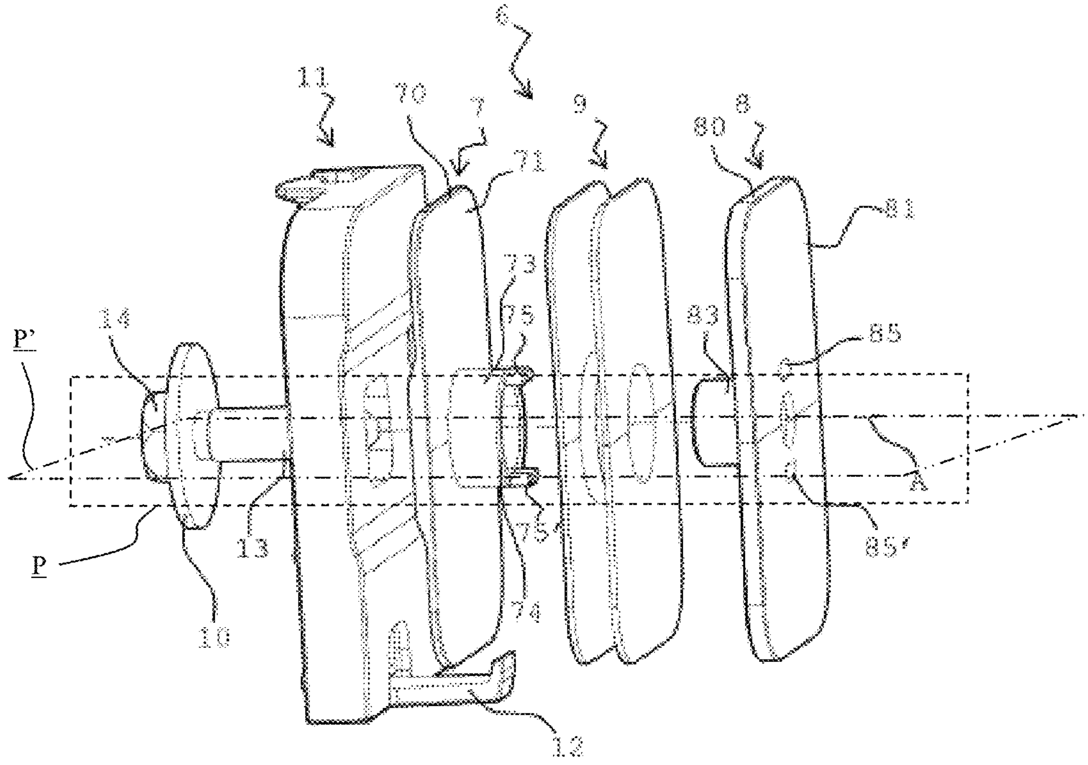
FIG. 8 illustrates an exploded perspective view of the window bracket of FIG. 5 with the attachment rod and the intermediate support component.

The present invention relates to a glazing unit 1 as visible in FIG. 1 and partially in FIGS. 2 to 4, comprising a window 2. The window 2 in this instance is laminated and comprises an exterior sheet of glass 3, an interior sheet of glass 5 and an interleaved sheet of adhesive 4 situated between said two sheets of glass and in contact with these two sheets of glass.

The present invention is described by way of example in the context of an application as a vehicle glazing unit, this glazing unit providing separation between an exterior space E which is outside the vehicle and an interior space I which is inside the vehicle. The ideas of “exterior face” and “interior face” are therefore considered respectively with respect to this exterior space E and this interior space I.

In the figures, the sheets of glass are each illustrated as having a straight edge face; however, these edge faces could be rounded, with the edge corners between the edge faces and the main faces then being at a curved angle.

The present invention is described in particular in an application to a vehicle side glazing unit and more specifically in the context of an application to a vehicle door side window glazing unit that can be used heightwise, along the vertical; FIG. 1 being a view in perspective, from the interior space I, of the glazing unit 1 before it is installed in a door.

In the context of the present document, the notion of verticality is introduced with reference to the vertical axis Z of a vehicle; the central horizontal longitudinal axis of forward travel of the vehicle equipped with the glazing unit according to the invention by way as a side glazing unit generally being the axis referred to as the axis X of the vehicle, as visible in FIG. 1, and the horizontal lateral axis being the axis Y (not illustrated).

The glazing unit 1 is intended to close an opening which in this case is formed in a door of the vehicle, the door not being illustrated.

The window 2 of the glazing unit 1 may be a monolithic glass window made up of a single sheet of glass but is preferably here a laminated window which, from the inside toward the outside and in contact comprises at least: the exterior sheet of glass 3, the interlayer of adhesive 4 and the interior sheet of glass 5; however, it is possible for at least one other sheet to be interposed between the exterior sheet of glass 3 and the interlayer of adhesive 4 or between the interlayer of adhesive 4 and the interior sheet of glass 5.

The window 2 has an exterior face 20 which faces toward the exterior space E, an interior face 22 which faces toward the interior space I and an edge face 21 situated between these two faces. In this instance, the window is curved.

The exterior sheet of glass 3 has an exterior face which coincides with the exterior face 20 of the window 2, an interlayer face which faces toward the interlayer of adhesive 4, and an edge face 31 situated between these two faces.

The interior sheet of glass 5 has an interlayer face facing toward the interlayer of adhesive 4, an interior face which coincides with the interior face 22 of the window 2 and an edge face 51 situated between these two faces.

The interlayer of adhesive 4 has an exterior interlayer face which faces toward the interlayer face and in this instance is in contact with this interlayer face, an interior interlayer face which faces toward the interlayer face and which in this instance is in contact with this interlayer face, and an edge face 41 which is situated between these two interlayer faces.

The edge face 21 of the window 2 thus corresponds to the edge face 31 of the exterior sheet of glass 3, to the edge face 41 of the interlayer sheet of adhesive 4 and to edge face 51 of the interior sheet of glass 5, these three edge faces here being substantially continuous with one another, give or take 1 millimeter.

The window glazing 1 is intended to be movable heightwise and the window 2 for that purpose comprises at least one tubular hole 23, 23', opening onto the two faces of the window, the exterior face 20 and the interior face 22, along a thickness $e_{23}$ which is the thickness of the window all around the hole. This hole 23 has an axis and has a circular internal cross section; it does not open onto the edge face 21 of the window: it is entirely of circular cross section and is not a notch. At the site of the hole 23, the window 2 has a thickness $e_{23}$, for example in this instance of 6.0 mm.

The glazing unit 1 comprises, aside from the window 2, near to one edge (in this instance the lower longitudinal edge), a window bracket 6, supporting the window 2. This window bracket 6 comprises a hole having an axis A which is intended to allow the accommodation of an attachment rod 13 that likewise has an axis and this rod, which in this instance is tubular, is intended to pass through the window 2 through the hole 23; it is the axis of the window bracket hole that serves as a reference for mounting the window bracket in a movement system for raising and lowering the glazing unit.

To make it easier to move the glazing unit heightwise, a second window bracket (not illustrated) is preferably positioned at the site of the second hole 23'; the glazing unit 1 in its configuration of use thus comprises preferably two window brackets 6.

This window bracket 6 comprises a part extending further inward than the interior face 22 of the window and a part extending further outward than the exterior face 20 of the window, as well as a part extending under the edge face 21 of the window.

This window bracket 6 comprises two elements situated facing one another on each side of the window in the region of the hole 23 and collaborating with one another:

on the one hand, a flange 7 comprising a plate 70 having an exterior face 71 which faces toward the exterior space E, an interior face 72 which faces toward the interior space I; this plate 70 is positioned, preferably without direct contact, facing one face of the window 2, and here facing the interior face 22 of the window 2, and on the other hand, a counter-flange 8 comprising a counter-plate 80 having an exterior face 81 which faces toward the exterior space E, an interior face 82 which faces toward the interior space I; this counter-plate 80 being positioned, preferably without direct contact, facing another face of the window 2, and in this instance facing the exterior face 20 of the window 2.

The window bracket is preferably made up of these two elements (these two parts which are separate prior to mounting): the flange 7 and the counter-flange 8; without any other element.

The plate 70 extends all around the hole 23 in the window, being situated further toward the inside than the interior face 22.

The flange 7 further comprises a hollow tubular sleeve 73 of which a wall extends into the hole 23 in the window 2, in this instance in the direction of the exterior, along a sleeve thickness $e_{73}$; this sleeve thickness $e_{73}$ is greater than the thickness $e_{23}$ so that the wall of the sleeve 73 extends both further toward the outside than the face 20 and further toward the inside than the face 22; said sleeve 73 has an axis which is coaxial with the axis A. The sleeve 73 is completely tubular along the entire length of the sleeve thickness $e_{73}$; its internal diameter and its external diameter are constant all the way along this sleeve thickness $e_{73}$.

The counter-plate 80 extend all around the hole 23 in the window, further toward the outside than the exterior face 20.

The counter-flange 8 further comprises a hollow tubular counter-sleeve 83, of which a wall extends into the hole 23 of the window 2, in this instance in the direction of the inside, over a counter-sleeve thickness $e_{83}$; this counter-sleeve thickness $e_{83}$ is greater than the thickness $e_{23}$ so that the wall of the counter-sleeve 83 extends both further toward the outside than the face 20 and further toward the inside than the face 22; the wall of the counter-sleeve 83 further extends into the sleeve 73. The counter-sleeve 83 is completely tubular over the entire counter-sleeve thickness $e_{83}$; its internal diameter and its external diameter are constant all along this counter-sleeve thickness $e_{83}$.

The plate 70 and the counter-plate 80 are two elements that are distinct prior to mounting; for example they are not joined together by a hinge. The plate 70 and the counter-plate 80 are not washers; they each have a surface that is fixed in the frame of reference of the window bracket; this surface furthermore has a substantial surface area in order to be able to adapt to the shape of the faces of the adjacent window and thus facilitate mounting. The surface area of the plate 70 and the counter-plate 80 is of the order of 3 to 20 times the surface area occupied by the hole 23; for example 10 times.

The sleeve 73 lies flush with the interior face 82 of the counter-plate 80 and the counter-sleeve 83 lies flush with the interior face 72 of the plate 70.

At an opposite end to the plate 70 the sleeve 73 comprises an annular end stop 74 to come into contact with and immobilize the interior face 82 of the counter-plate 80; in that way, the counter-flange 8 is not able to travel further toward the interior space I than the position authorized by this end stop 74.

The sleeve 73 further comprises, at its opposite end to the plate 70, two pins 75, 75' which each enter the counter-plate 80 via its interior face 82. These two pins 75, 75' each pass through the counter-plate 80 through an opening 85, 85' and in this way the counter-flange is correctly oriented with respect to the flange.

In the position of use, the attachment rod 13 is situated in the counter-sleeve 83 and is attached to the counter-sleeve 83 and thus to counter-flange 8. In this instance, the attachment rod 13 is threaded and is thus screwed into the counter-sleeve 83.

As visible in FIG. 4, the plate 70 and the sleeve 73 belong to the flange 7; the sleeve 73 is a smooth-walled hollow cylinder which has an axis and extends along a perpendicular from the exterior face 71 of the plate 70. Its external diameter in this instance is 18 mm and its internal diameter in this instance is 14 mm, all along the sleeve thickness $e_{73}$. The sleeve thickness $e_{73}$, measured from the exterior face 71, is comprised between 6 and 10 mm and in this instance is for example 8 mm. In the glazing unit 1, the sleeve thickness $e_{73}$, measured from the exterior face 71 of the plate 70 as far as the interior face 82 of the counter-plate 80.

Similarly, the counter-plate 80 and the counter-sleeve 83 belong to the counter-flange 8; the counter-sleeve 83 is a hollow cylinder which has an axis and it extends along a perpendicular from the interior face 82 of the counter-plate 80. Its external diameter is in this instance 13 mm and its internal diameter is in this instance 6.8 mm (designed for a M8-type screwthread), all along the counter-sleeve thickness $e_{83}$. The centripetal wall of the counter-sleeve 83 is smooth and its centrifugal wall is threaded so that the attachment rod 13 can be screwed in. The counter-sleeve thickness $e_{83}$, measured from the interior face 82 is comprised between 8.0 and 15.0 mm, and in this instance is for example 11.5 mm.

The counter-sleeve thickness $e_{83}$ is thus greater than the sleeve thickness $e_{73}$ but it is entirely possible for the counter-sleeve thickness $e_{83}$ to be smaller. To facilitate the manufacture of the counter-plate 80, for example, when it is made of a metal or of a metal alloy, it is possible to produce the counter-sleeve 83 by localized deformation (for example cracking), and then threading the interior wall of the counter-sleeve. The counter-sleeve thickness $e_{83}$ is thus identical to the sleeve thickness $e_{73}$ increased by the thickness of a pin 75, 75'.

The counter-flange, the counter-plate and the counter-sleeve are so named because they constitute a set of components that respectively complement the flange, the plate and the sleeve in order together to form the two essential parts of the window bracket, which are each positioned one on either side of the window, at the site of the hole.

The flange and the counter-flange are preferably each made of one piece and more preferably still from a single material; they are rigid; they may, one or both of them, be made of plastic or of metal or else of a metal alloy. It is notably possible for the flange 8 to be made of metal, but for the flange 7 to be made of plastic; or alternatively for the counter-flange to be made of metal but for the rest of the window bracket to be made of plastic. Metallic materials are mechanically stronger, but plastic is more lightweight.

Mechanical attachment of the window bracket 6 to the window 2 is performed by:

positioning the flange 7 comprising the plate 70 so that it faces one face of the window 2, and in this instance so that it faces the interior face 22 of the window 2; the flange 7 comprising a tubular sleeve 73 of a sleeve thickness $e_{73}$, this sleeve is inserted into the hole 23 in the window 2, in the direction of the exterior space E, so that its wall extends inside this hole 23, then positioning the counter-flange 8 comprising the counter-plate 80 so that it faces one face of the window 2, and in this instance so that it faces the exterior face 20 of the window 2; the counter-flange 8 comprising a tubular counter-sleeve 83, with a counter-sleeve thickness $e_{83}$, this counter-sleeve is inserted/slid into the sleeve 73 of the flange 7 in the direction of the interior space I so that its wall extends inside this sleeve, because the sleeve 73 comprises, at an opposite end to the plate 70, at least one end stop 74, this end stop immobilizes the counter-plate 80 and, therefore, the counter-flange 8.

The counter-sleeve 83 has an external diameter which is identical to the internal diameter of the sleeve 73, or else a diameter up to −1.2 mm smaller, so that the counter-sleeve 83 can slide without clearance inside the sleeve 73.

The plate 70 is preferably positioned some distance from the interior face 22 of the window 2 so as to leave a space between these, and the counter-plate 80 is preferably positioned some instance away from the exterior face 20 of the window 2 so as to leave a space between these.

The fixing of the window bracket 6 to the window 2 is performed by the layer of adhesive 9 which is applied in the hole 23 before the flange 7 is positioned facing the face of the window 2, and in this instance facing the interior face 22 of the window 2.

This layer of adhesive 9 is preferably also applied to the exterior face 71 of the plate 70 and/or to the interior face 22 of the window 2 before the flange 7 is positioned facing the interior face 22 of the window 2. It is thus situated in the space between the exterior face 71 and the interior face 22, preferably filling this entire space.

This layer of adhesive 9 is preferably also applied to the interior face 82 of the counter-plate 80 and/or to the exterior face 20 of the window 2 before the counter-flange 8 is positioned facing the exterior face 20 of the window 2. It is thus situated in the space between the interior face 82 and the exterior face 20, preferably filling this entire space.

The layer of adhesive 9 is illustrated schematically in FIG. 4; it is possible to replace this layer of adhesive with a flexible seal of similar size, for example made of silicone, including a flexible seal which is able to create adhesion with the materials in contact with it, for example through the application of heat.

The sleeve 73 comprises, at an opposite end to the plate 70, to which it is connected, two pins 75, 75' each of which enters an opening 85, 85' formed through the counter-plate 80; these end stops (and, respectively, these openings) are preferably situated diametrically opposite one another about said axis A and more preferably still are situated diametrically opposite one another about the vertical.

Each pin 75, 75' is made up of a projecting part of the wall of the sleeve 73 which extends locally into the counter-plate 80, preferably along the entirety of the thickness of the counter-plate 80, more preferably still, without extending beyond the counter-plate 80.

The axis A of the window bracket is the axis of the counter-sleeve 83; it is also that of the sleeve 73 because the counter-sleeve is fitted without clearance into the sleeve.

For the sake of convenience, it is considered here for the purposes of the description of the invention, that the axis A of the window bracket 6 is coincident with that of the hole 23 in the window. In reality, it is the axis of the counter-sleeve 83, incidentally the axis of the attachment rod 13 when introduced into this counter-sleeve, that constitutes the reference for attaching the glazing unit in the movement system. In effect, it is entirely possible for the axis of the hole 23 not to be positioned correctly in space with respect to the overall dimensions of the window and points of reference of the window; however, the space between the sleeve 73 and the hole 23 allows the introduction of clearance between these which will be used to perfectly position this sleeve 73 and then the counter-sleeve 83 so that both have their axes parallel in space and so that this axis, which will then be the axis of the attachment rod 13 when it is in the counter-sleeve 83, is correctly oriented in space with respect to that which is required for correct operation of the window movement system.

FIGS. 4 to 8 illustrate the glazing unit 1 with, in addition, part of the movement system.

When the glazing unit is being attached in the movement system, the attachment rod 13 is introduced into the counter-sleeve 83 and is attached to the counter-flange 8 by means of the counter-sleeve; the attachment rod 13 could be clipped into counter-sleeve 83 but is preferably screwed into the counter-sleeve 83 in order to give high mechanical strength; the counter-sleeve thus acts as a nut and the glazing unit therefore does not comprise any independent nut at the site of the window bracket.

The attachment rod 13 for fixing the window bracket in this instance has a solid cylindrical cross section and is threaded on its surface. It also comprises a head 14.

An intermediate support component 11 is also provided between the head 14 of the rod 13 to allow the window bracket to be attached to a lifting system. This may be a component referred to as a "regulator".

This intermediate support component 11 preferably having at least one finger 12 extending against part of the edge face 21 of said window 2, this finger 12 also preferably extending against the exterior face 20 of the window 2. It essentially acts as a protective end stop when the window is being installed in the door.

This intermediate support component 11 has a hole for the passage of the attachment rod 13, of a diameter similar to the diameter of the hole 23 in the window. The intermediate support component 11 is not in contact with the counter-sleeve 83, so as to make position adjustment easier.

In the version illustrated, a washer 10 is situated between the head 14 of the attachment rod 13 and the intermediate support component to provide bracing; in this instance on the interior side.

The fact that the sleeve 73 comprises an end stop 75 to immobilize the counter-plate 80 makes it possible to create a spacer between the flange 7 and the counter-flange 8, which means to say that the space between them is controlled by this end stop. They press mechanically against one another making it possible to create a window bracket that is particularly strong, regardless of the fragility of the window.

This spacer is the thickness that is common to the two thicknesses; the sleeve $e_{73}$ and the counter-sleeve thickness $e_{83}$.

Furthermore, this spacer is larger than the thickness of the window at the site of the hole 23 and thus offers the possibility of adjusting the positioning of the axis common to the two flanges (the axes of the sleeve 73 and of the counter-sleeve 83, which are coincident) to make it correspond exactly to the desired positioning in space for correct operation of the window moving system, and do so even if, initially the axis of the hole 23 is not correctly positioned in space.

When the flange 7 and the counter-flange 8 are not in direct contact with the window 2 it is possible to make them from metal or from a metal alloy. When the flange 7 and the counter-flange 8 are made of metal or of metal alloy they are particularly mechanically strong.

The window bracket 6 is particularly compact; its total thickness $e_6$ is of the order of 14 mm.

The invention claimed is:

1. A glazing unit for a vehicle that is movable heightwise and comprises a window, said window having an exterior face intended to face toward an exterior space, an edge face and an interior face intended to face toward an interior space, said window comprising at least one open-ended tubular hole having a thickness, and at least one window bracket having an axis passing through said window via said at least one open-ended tubular hole, wherein said window bracket comprises:

a flange comprising a plate positioned facing one face of said window and a tubular sleeve, of which a wall extends into the at least one open-ended tubular hole in said window along a sleeve thickness, a counter-flange comprising a counter-plate positioned facing another face of said window and a tubular counter-sleeve of which a wall extends along a counter-sleeve thickness into the sleeve of said flange, with said tubular sleeve comprising, at an opposite end to said plate, at least one end stop that is in contact with the counter-plate so as to immobilize said counter-plate.

2. The glazing unit as claimed in claim 1, wherein a layer of adhesive is situated in the at least one open-ended tubular hole, between said window and said sleeve.

3. The glazing unit as claimed in claim 2, wherein said layer of adhesive is situated between at least one of the interior and exterior faces and the plate and/or counter-plate.

4. The glazing unit as claimed in claim 3, wherein said layer of adhesive is situated between both the interior and exterior faces of said window and the plate and counterplate.

5. The glazing unit as claimed in claim 1, wherein said counter-sleeve has an external diameter which is identical, to within 1.2 mm, to an internal diameter of said sleeve.

6. The glazing unit as claimed in claim 1, wherein said sleeve thickness is greater than said thickness of said window at a site of the at least one open-ended tubular hole.

7. The glazing unit as claimed in claim 1, wherein said counter-sleeve thickness is greater than said thickness of said window at a site of the at least one open-ended tubular hole.

8. The glazing unit as claimed in claim 1, wherein said counter-sleeve thickness is greater than said sleeve thickness.

9. The glazing unit as claimed in claim 1, wherein the window is a laminated window.

10. The glazing unit as claimed in claim 1, wherein the plate is positioned facing said interior face of said window.

11. The glazing unit as claimed in claim 1, wherein the counter-plate is positioned facing said exterior face of said window.

12. A glazing unit for a vehicle that is movable heightwise and comprises a window, said window having an exterior face intended to face toward an exterior space, an edge face and an interior face intended to face toward an interior space, said window comprising at least one open-ended tubular hole having a thickness, and at least one window bracket having an axis passing through said window via said at least one open-ended tubular hole, wherein said window bracket comprises:

a flange comprising a plate positioned facing one face of said window and a tubular sleeve, of which a wall extends into the at least one open-ended tubular hole in said window along a sleeve thickness, a counter-flange comprising a counter-plate positioned facing another face of said window and a tubular counter-sleeve of which a wall extends along a counter-sleeve thickness into the sleeve of said flange, with said sleeve comprising, at an opposite end to said plate, at least one end stop to immobilize said counter-plate, wherein said flange comprises at least one pin which enters said counter-plate.

13. The glazing unit as claimed in claim 12, wherein said pin consists of part of the wall of said sleeve which extends locally into said counter-plate.

14. The glazing unit as claimed in claim 12, wherein said flange comprises at least two pins which enter said counter-plate, the at least two pins being situated diametrically opposite one another about said axis.

15. The glazing unit as claimed in claim 13, wherein the part of the wall of said sleeve extends along an entire thickness of said counter-plate without extending beyond said counter-plate.

16. A method for producing a glazing unit for a vehicle that is movable heightwise, said glazing unit comprising a window, said window having an exterior face intended to face toward an exterior space, an edge face and an interior face intended to face toward an interior space, said window comprising at least one open-ended tubular hole having a thickness, and at least one window bracket having an axis passing through said window via said at least one open-ended tubular hole, wherein said window bracket includes a flange comprising a plate positioned facing one face of said window and a tubular sleeve, of which a wall extends into the at least one open-ended tubular hole in said window along a sleeve thickness, a counter-flange comprising a counter-plate positioned facing another face of said window and a tubular counter-sleeve of which a wall extends along a counter-sleeve thickness into the sleeve of said flange, with said tubular sleeve comprising, at an opposite end to said plate, at least one end stop that is in contact with the counter-plate so as to immobilize said counter-plate, in which method, the attaching of said window bracket to said window comprises:

positioning the flange comprising the plate facing said one face of said window, and the tubular sleeve, of which the wall extends into the at least one open-ended tubular hole in said window along the sleeve thickness, then positioning the counter-flange comprising the counter-plate facing said one face of said window and the tubular counter-sleeve of which the wall extends along the counter-sleeve thickness into the sleeve of said flange, with said sleeve comprising, at an opposite end to said plate, at least one end stop that is in contact with the counter-plate so as to immobilize said counter-plate.

17. The method as claimed in claim 16, wherein the window is a laminated window.

18. The method as claimed in claim 16, wherein the plate is positioned facing said interior face of said window.

19. The method as claimed in claim 16, wherein the counter-plate is positioned facing said exterior face of said window.

* * * * *